United States Patent [19]

Keijser et al.

[11] 4,213,100
[45] Jul. 15, 1980

[54] GAS DISCHARGE LASER

[75] Inventors: Robertus A. J. Keijser; Gustaaf A. Wesselink; Bram J. Derksema; Johannes A. T. Verhoeven, all of Eindhoven, Netherlands

[73] Assignee: U.S. Philips Corporation, New York, N.Y.

[21] Appl. No.: 903,887

[22] Filed: May 8, 1978

[30] Foreign Application Priority Data

May 23, 1977 [NL] Netherlands ......................... 7705623

[51] Int. Cl.² ............................................... H01S 3/03
[52] U.S. Cl. ........................... 331/94.5 D; 331/94.5 G
[58] Field of Search ...................... 331/94.5 D, 94.5 G

[56] References Cited

U.S. PATENT DOCUMENTS 3,735,281  5/1973  Bouhuis et al. ................. 331/94.5 G Primary Examiner—William L. Sikes
Attorney, Agent, or Firm—Thomas A. Briody; William J. Streeter; Bernard Franzblau

[57] ABSTRACT

A gas discharge laser in which at least the inner wall of the laser tube is manufactured for the greater part from a gehlenite glass thereby providing a laser having a long life. The gehlenite glass can better withstand the eroding effect of the gas discharge so that the rate at which the optical elements are contaminated is greatly reduced.

7 Claims, 3 Drawing Figures

GAS DISCHARGE LASER

The invention relates to a gas discharge laser comprising a glass envelope and two laser mirrors the optical axis of which coincides with the longitudinal axis of the part of the envelope forming the laser tube.

The invention also relates to glass envelopes for such gas discharge lasers.

Many types of gas discharge lasers are known which can be classified according to the nature of the lasing medium, for example, He-Ne-lasers, He-Cd-lasers, $CO_2$-lasers, or according to their construction, for example, coaxial lasers, side-arm lasers, lasers in which the laser mirrors are provided directly on the laser tube, and lasers in which the laser tube is sealed with windows and the laser mirrors are arranged separately.

A gas laser generally forms a highly loaded system in which the wall of the discharge space is often subject to considerable erosion. As a result of this a pollution of the system may occur in which in particular a possible degradation of the optical elements, such as mirrors and/or Brewster windows, is very unfavourable for the life of the lasers. Quartz is often used for the wall of the discharge space. Nowadays, however, other cheaper kinds of glass, such as borosilicate or lead glass, are also used.

It is an object of the present invention to provide a gas discharge laser in which the wall of the discharge vessel can very well withstand the eroding effect of the gas discharge. As a result of this, the optical losses increase considerably more slowly and the life of the gas discharge laser is prolonged.

According to the invention, a gas discharge laser of the kind mentioned in the first paragraph is characterized in that at least the inner wall of the laser tube comprised of a gehlenite glass.

Gehlenite glass is known per se from Netherlands Patent Application No. 67 10 744 laid open to public inspection and has the following composition in mol.%:
$SiO_2$: 14–43
$B_2O_3$: 0–10
$Al_2O_3$: 9–37
CaO: 15–61
BaO: 0–35
BeO: 0–24
MgO: 0–24
$Li_2O + Na_2O$: 0–27.5,
the total of $CaO + BaO + BeO + MgO + Li_2O + Na_2O$ being 38–61. Said gehlenite glass proves to be not only chemically resistant to sodium vapour as described in the said Netherlands Patent Application, but according to the present invention it can also well withstand the reducing effect of the gas discharge. In experiments with He-Ne-gas discharge lasers in which the envelope of the lasers consisted of borosilicate glass, e.g. of pyrex, a significant relationship is found to exist between reduction in laser power and pollution of the optical elements with the decomposition products of the pyrex. A surface examination of the multilayer mirrors (last layer consisting of $TiO_2$) connected to the end of the laser tube demonstrated traces of Si and B originating from the wall of the discharge space.

In the case of gehlenite glass the erosion of the glass wall proves to be much less than in a similar laser made of pyrex. It also has been found that the wall of the discharge vessel does not become brown or black after a large number of hours in operation, as is the case in, for example, lasers having laser tubes made of quartz or pyrex. A result of the reduced erosion is that the life of the laser is prolonged.

It has proved to be sufficient to manufacture only the inner wall of the laser tube of gehlenite glass. This may be done by sliding an inner jacket of gehlenite glass into the laser tube.

The invention will now be described in greater detail with reference to the accompanying drawing, in which:

FIG. 1 shows diagrammatically a He-Ne-laser of the side-arm type having its laser mirrors directly connected to the laser tube. The laser comprises the laser tube 1 mode of gehlenite glass of the following composition in mol.%:
$SiO_2$: 35
$Al_2O_3$: 20
CaO: 17.5
BaO: 17.5
$Li_2O$: 10.

Figure 1:
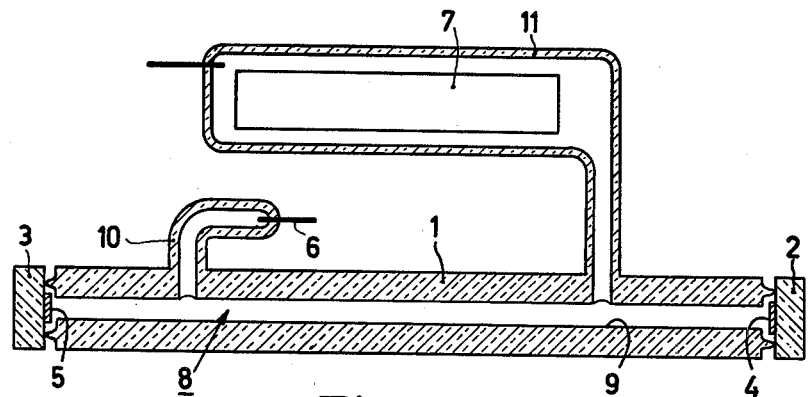
FIGS. 1 and 3 are diagrammatic longitudinal sectional views of a He-Ne-laser according to the invention.

The laser tube is sealed with laser mirrors which are composed of substrates 2 and 3 having the mirroring multilayers 4 and 5 thereon. The anode 6 and the cathode 7 are present in the side-arms 10 and 11. The gas filling 8 consists of 15% Ne and 85% $^4$He. Said He-Ne-laser furthermore has the following laser parameters:

| Length of the laser tube | 250 mm |
| --- | --- |
| length of the active discharge | 205 mm |
| discharge current | 5 mA |
| inner diameter tube | 1.4 mm |
| filling pressure | 3 Torr |
| resonator configuration | nearly hemispherical |
| radius of the coupling-out mirror | 30.9 mm |
| transmission of the coupling-out mirror | approximately 1% |
| output power | approximately 2 mWatt at 6328 Å. |

Figure 2:
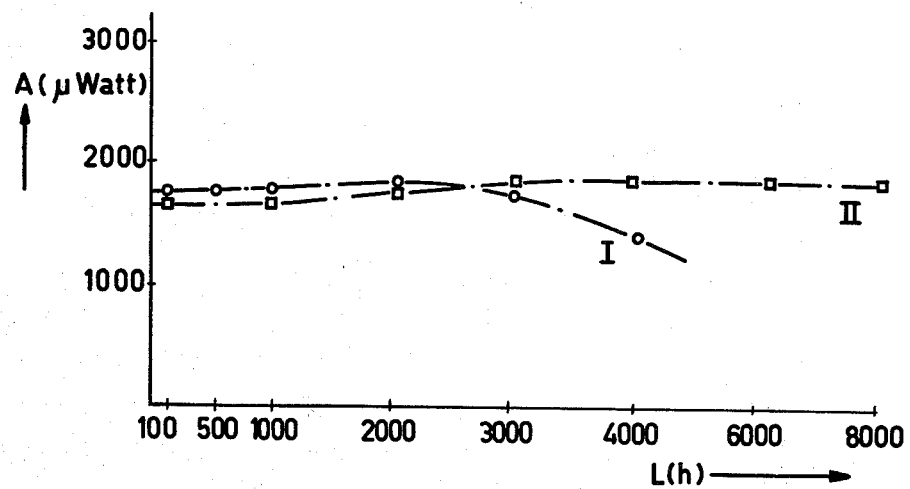
FIG. 2 shows a graph comparing the output power as a function of the life of a laser mode of pyrex with the output power as a function of the life of a laser with a gehlenite glass wall of the laser mode tube in identical circumstances.

In FIG. 2 the output power is compared as a function of the life of a laser of the type shown in FIG. 1 with the output power as a function of the life of a similar laser mode of pyrex. After 2000 hours in operation the output power I of the laser mode of pyrex decreased significantly, whereas the output power of a laser mode of gehlenite glass II did not yet decrease significantly after 8000 hours in operation.

The invention is not restricted to the explicitly described He-Ne-laser but may also be used, for example, in metal vapour lasers.

It has been found that it is often sufficient to manufacture only the inner wall 9 of the laser tube of gehlenite glass. Lasers which have a laser tube sealed by Brewster windows were also found to have a longer life by using the invention.

Figure 3:
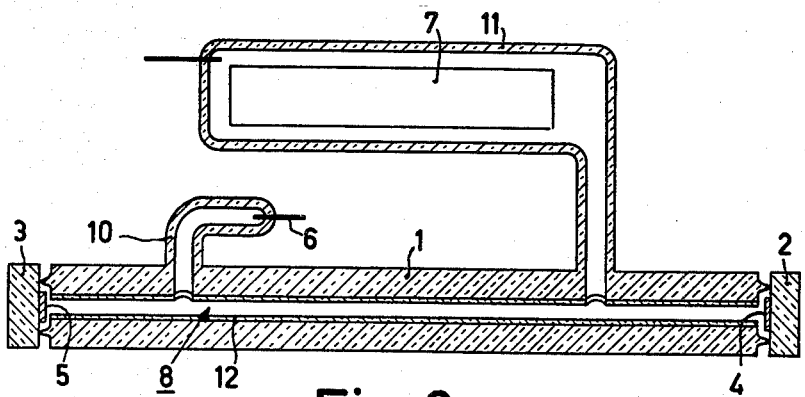

FIG. 3 shows a laser mode of pyrex having the same parameters as the laser of FIG. 1. In this case the invention has been applied by sliding a jacket 12 mode of gehlenite glass into the laser tube 1.

What is claimed is:
1. A gas discharge laser comprising: a glass envelope containing a lasing gas medium for producing a dis- charge and with a part of the envelope forming a laser tube having an axis, first and second laser mirrors arranged so that the optical axis thereof coincides with the axis of the laser tube and forming therewith a resonant cavity, first and second electrodes positioned in spaced relationship in said glass envelope for exciting the lasing gas, and wherein at least an inner wall of the laser tube comprises a gehlenite glass.

2. A gas discharge laser as claimed in claim 1 wherein the inner wall of the laser tube comprises an inner jacket of gehlenite glass coaxially located within the laser tube.

3. A gas discharge laser as claimed in claim 1, wherein the whole glass envelope comprises a gehlenite glass.

4. An envelope for a gas discharge laser comprising a laser tube having an inner wall comprised of gehlenite glass.

5. An envelope for a gas discharge laser comprising a laser tube having an inner jacket comprised of gehlenite glass coaxially located within the laser tube.

6. A gas discharge laser comprising a laser tube having at least an inner wall comprised of gehlenite glass, a lasing gas contained within the laser tube, first and second laser mirrors located near opposite ends of the laser tube to form a resonant cavity and arranged so that the optical axis thereof coincides with the longitudinal axis of the laser tube, and means for exciting said lasing gas.

7. A gas discharge laser as claimed in claim 6 wherein said inner wall of the laser tube comprises a tubular inner jacket comprised of gehlenite glass coaxially located within the laser tube.

* * * * *